(12) United States Patent
Sattinger et al.

(10) Patent No.: US 10,476,557 B2
(45) Date of Patent: Nov. 12, 2019

(54) EFFICIENT CONTROL MECHANISM IN DISTRIBUTED ANTENNA MODULES

(71) Applicant: QUALCOMM Incorporated, San Diego, CA (US)

(72) Inventors: Arnon Sattinger, Zichron Yaacov (IL); Yossi Herzog, Kiryat Ata (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/823,354

(22) Filed: Nov. 27, 2017

(65) Prior Publication Data
US 2018/0159599 A1    Jun. 7, 2018

Related U.S. Application Data

(60) Provisional application No. 62/430,913, filed on Dec. 6, 2016.

(51) Int. Cl.
| | |
|---|---|
| *H04B 7/005* | (2006.01) |
| *H04W 52/54* | (2009.01) |
| *H04B 7/26* | (2006.01) |
| *H04W 92/00* | (2009.01) |
| *H04J 99/00* | (2009.01) |

(52) U.S. Cl.
CPC .......... *H04B 7/005* (2013.01); *H04B 7/2606* (2013.01); *H04W 52/54* (2013.01); *H04J 15/00* (2013.01); *H04W 92/00* (2013.01)

(58) Field of Classification Search
CPC ...... H04B 1/0483; H04B 1/40; H04B 1/0007; H04B 1/0067; H04B 1/3805; H04B 7/0404; H04B 7/0689; H04B 7/0871; H04B 1/18; H04B 7/005; H04B 7/2606

USPC .......................................................... 455/572
See application file for complete search history.

(56) References Cited

U.S. PATENT DOCUMENTS

| | | | | |
|---|---|---|---|---|
| 2009/0115384 | A1* | 5/2009 | Venes .................... | H02M 3/158 323/280 |
| 2012/0307695 | A1* | 12/2012 | Yehezkely ............... | H01P 5/20 370/310 |
| 2012/0309325 | A1 | 12/2012 | Carbone et al. | |
| 2015/0087248 | A1* | 3/2015 | Yehezkely ........... | H04B 1/0007 455/84 |

OTHER PUBLICATIONS

International Search Report and Written Opinion—PCT/US2017/063703—ISA/EPO—dated Apr. 20, 2018.

* cited by examiner

*Primary Examiner* — Ajibola A Akinyemi
(74) *Attorney, Agent, or Firm* — Patterson & Sheridan, L.L.P.

(57) ABSTRACT

Certain aspects of the present disclosure relate to methods and apparatus for wireless communication. In certain aspects, the apparatus generally includes a first interface configured to obtain, from a baseband module, a multiplexed signal comprising a control signal, a second interface configured to obtain a power signal, a radio frequency (RF) module, a regulator coupled to the second interface and configured to receive the power signal, and a circuit configured to provide the control signal to the regulator. In certain aspects, the regulator, in response to the control signal, may be configured to generate a supply voltage signal by regulating the power signal and provide the supply voltage signal to the RF module.

8 Claims, 10 Drawing Sheets

EFFICIENT CONTROL MECHANISM IN DISTRIBUTED ANTENNA MODULES

CLAIM OF PRIORITY UNDER 35 U.S.C. § 119

The present application claims the benefit of U.S. Provisional Patent Application Ser. No. 62/430,913, entitled "EFFICIENT CONTROL MECHANISM IN DISTRIBUTED ANTENNA MODULES" and filed Dec. 6, 2016, which is assigned to the assignee of the present application and hereby expressly incorporated by reference herein in its entirety.

FIELD

The present disclosure relates generally to wireless communication, and more particularly, to methods and apparatus for powering a radio-frequency (RF) module.

BACKGROUND

The 60 GHz band is an unlicensed band which features a large amount of bandwidth and a large worldwide overlap. The large bandwidth means that a very high volume of information can be transmitted wirelessly. As a result, multiple applications, that use transmission of a large amount of data, can be developed to allow wireless communication around the 60 GHz band. Examples for such applications include, but are not limited to, wireless high definition TV (HDTV), wireless docking stations, wireless Gigabit Ethernet, and many others.

SUMMARY

Certain aspects of the present disclosure provide improved techniques for apparatus controlling and powering a radio-frequency (RF) module of an RF system via a multiplexed signal.

Certain aspects of the present disclosure provide an apparatus for wireless communications. The apparatus generally includes a first interface configured to obtain, from a baseband module, a multiplexed signal comprising a control signal, a second interface configured to obtain a power signal, a radio frequency (RF) module, a regulator coupled to the second interface and configured to receive the power signal, and a circuit configured to provide the control signal to the regulator, wherein the regulator, in response to the control signal, is configured to generate a supply voltage signal by regulating the power signal and provide the supply voltage signal to the RF module.

Certain aspects of the present disclosure provide an apparatus for wireless communications. The apparatus generally includes a baseband module configured to generate a multiplexed signal having one or more signals to be provided to a radio-frequency (RF) module via one or more transmission lines, and an interface coupled to the baseband module and configured to provide the multiplexed signal to the one or more transmission lines, the multiplexed signal comprising a control signal to enable a voltage regulator.

Certain aspects of the present disclosure provide a method for wireless communication. The method generally includes obtaining a multiplexed signal comprising a control signal, obtaining a power signal, generating a supply voltage signal, in response to obtaining the control signal, by regulating the power signal, and providing the supply voltage signal to an RF module.

Certain aspects of the present disclosure provide a method for wireless communication. The method generally includes generating a multiplexed signal having one or more signals to be provided to a radio-frequency (RF) module via one or more transmission lines, and providing the multiplexed signal to the one or more transmission lines, the multiplexed signal comprising a control signal to enable a voltage regulator.

Certain aspects of the present disclosure provide an apparatus for wireless communications. The apparatus generally includes means for obtaining a multiplexed signal comprising a control signal, means for obtaining a power signal, means for generating a supply voltage signal, in response to obtaining the control signal, by regulating the power signal, and means for providing the supply voltage signal to an RF module.

Certain aspects of the present disclosure provide an apparatus for wireless communications. The apparatus generally includes means for generating a multiplexed signal having one or more signals to be provided to a radio-frequency (RF) module via one or more transmission lines, and means for providing the multiplexed signal to the one or more transmission lines, the multiplexed signal comprising a control signal to enable a voltage regulator.

Certain aspects of the present disclosure provide a wireless node. The wireless device generally includes at least one antenna, a first interface configured to obtain, from a baseband module, a multiplexed signal comprising a control signal, a second interface configured to obtain a power signal, a radio frequency (RF) module, a regulator coupled to the second interface and configured to receive the power signal, and a circuit configured to provide the control signal to the regulator, wherein the regulator, in response to the control signal, is configured to generate a supply voltage signal by regulating the power signal and provide the supply voltage signal to the RF module, wherein the RF module is configured to output for transmission RF signals via the at least one antenna.

Certain aspects of the present disclosure provide a wireless node. The wireless device generally includes a radio-frequency (RF) module, a baseband module configured to generate a multiplexed signal having one or more signals to be provided to the RF module via one or more transmission lines, and an interface coupled to the baseband module and configured to provide the multiplexed signal to the one or more transmission lines, the multiplexed signal comprising a control signal to enable a voltage regulator, wherein the RF module is configured to generate RF signals for transmission based on the one or more signals.

DETAILED DESCRIPTION

Certain aspects of the present disclosure provide improved techniques for controlling and powering an radio-frequency (RF) module of an RF system via a multiplexed signal. In certain aspects, the multiplexed signal may include a control signal that is used to enable/disable a regulator for providing a supply voltage signal to the RF module. In certain aspects, the regulator may receive a power signal from a power supply source that is separate from a source of the multiplexed signal, allowing for a reduction in the size of the RF system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of RF communication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Figure 1:
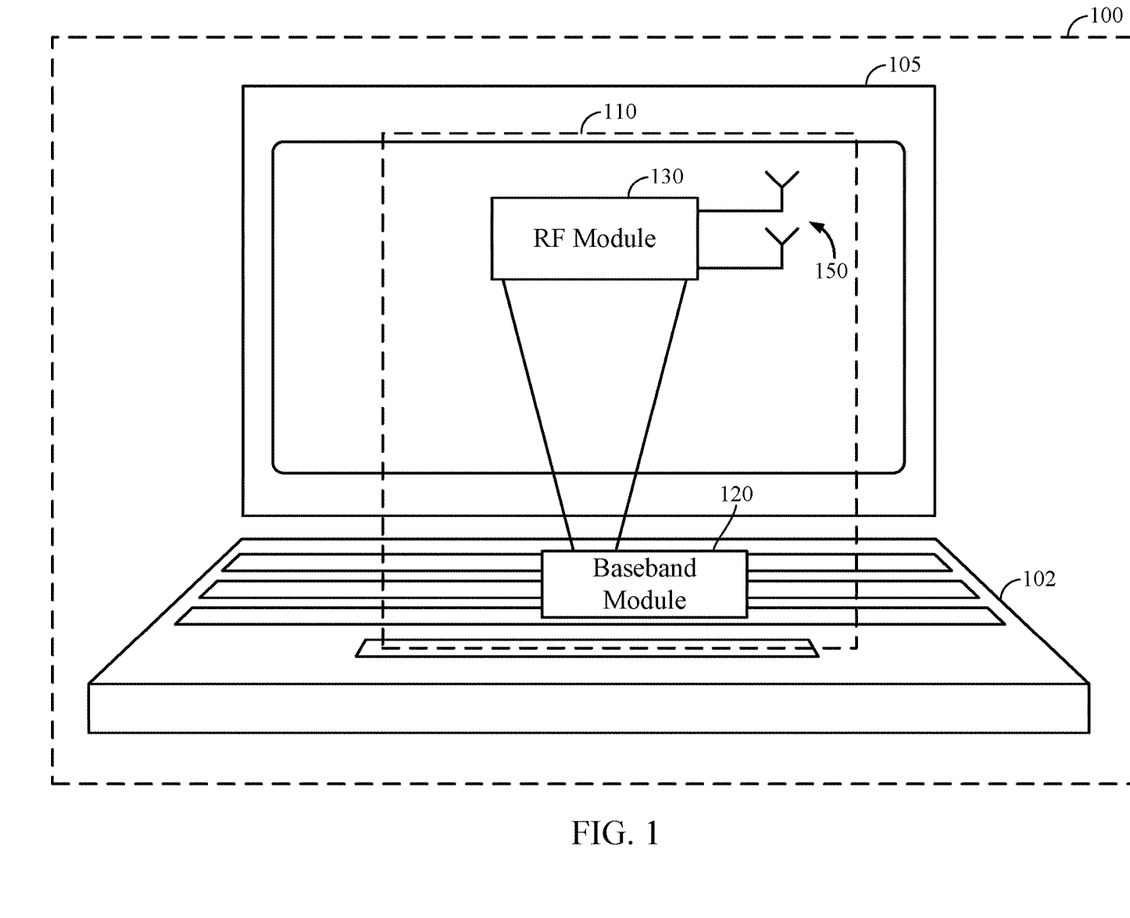
FIG. 1 illustrates an example laptop computer having radio transmission capabilities, in accordance with certain aspects of the present disclosure.

FIG. 1 illustrates an example laptop computer 100 that includes an RF system 110 for transmission and reception of signals. The form factor of the RF system 110 is spread between the base plane 102 and lid plane 105 of the laptop computer 100.

The RF system 110 includes a baseband module 120 and a RF module 130 respectively connected to the base plane 102 and lid plane 105. As used herein, an RF module 608 may refer to module having RF front end circuitry for generating RF signals, and a a baseband module may refer to a module configured to generate baseband signals. The RF module 130 may be coupled to active transmit (TX) and receive (RX) antennas. The TX and RX antennas may be one or more active antennas in an antenna array (e.g., a phased antenna array). When transmitting signals, the baseband module 120 may provide the RF module 130 with a control signal, and one or more other signals such as a local-oscillator (LO), intermediate frequency (IF). The control signal may be used for functions, such as gain control, RX/TX switching, power level control, sensors, and detector readouts. Specifically, beam-forming based RF systems may use high frequency beam steering operations which are performed under the control of the baseband module 120. The control signal may originate at the baseband module 120, and may be transferred between the baseband module 120 and the RF module 130.

The RF module 130 may perform up-conversion, using a mixer (not shown) on the IF signal(s), to generate RF signals and then transmits the RF signals via the antennas 150 according to the control of the control signals. A power signal such as a DC voltage signal may be used to power the various components of the RF module 130, as described in more detail herein.

In the receive direction, the RF module 130 receives RF signals (e.g., at the frequency band of 60 GHz), via the antenna 150 and performs down-conversion, using a mixer, to IF signals using the LO signals, and sends the IF signals to baseband module 120. The operation of the RF module 130 is controlled by the control signal, but certain control information (e.g., feedback signal) is sent back to the baseband module 120. In some cases, at least two cables (transmission lines) may be used to transfer the IF, LO, and control signals between the baseband module 120 and the RF module 130.

In some cases, the RF module 130 may be located close to the active antennas to perform the functions described above in order to reduce the power loss of the received and transmit signals. Thus, the baseband module 120 may be located apart from the RF module 130. Further, because transferring high frequency signals (e.g., the IF signal) over the cables may attenuate the high frequency signals, cables that provide low attenuation characteristics may be used.

While the example provided in FIG. 1 include a laptop computer to facilitate understanding, aspects of the present disclosure may be used by any wireless device (e.g., wireless node) for wireless communication. For example, aspects of the present disclosure may be used for wireless communication by a tablet, a base station, an access point, an access terminal, a user-equipment (e.g., a mobile phone), or a station.

Figure 2:
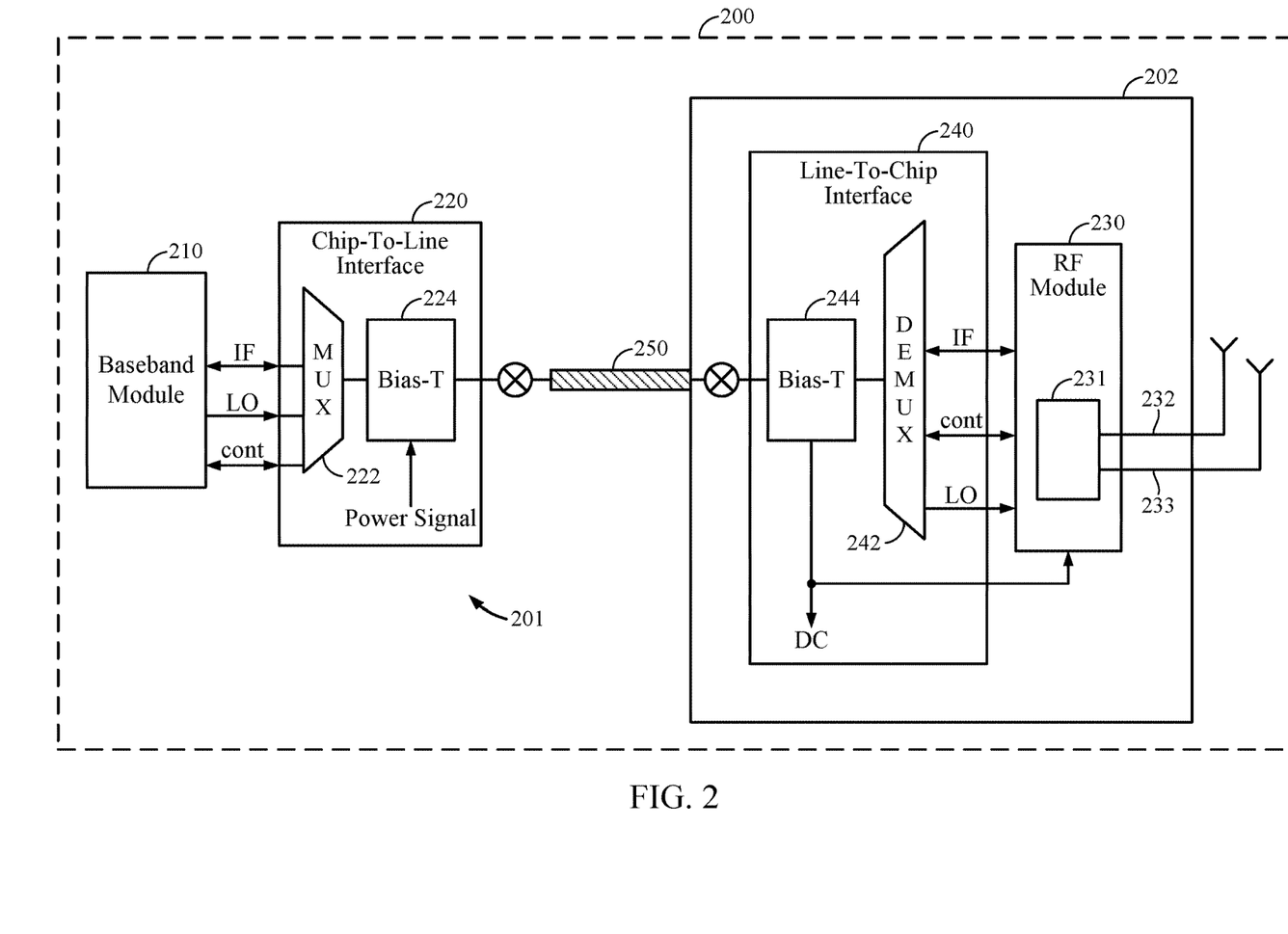
FIG. 2 illustrates an example radio frequency (RF) system, in accordance with certain aspects of the present disclosure.

FIG. 2 illustrates an example RF system 200 used to describe various aspects of the present disclosure. The RF system 200 includes a baseband module 210 coupled to a chip-to-line interface unit 220. In addition, the RF system 200 includes an RF module 230 coupled to a line-to-chip interface unit 240. The RF module 230 comprises RF circuitry 231 to perform up and down conversions of radio signals and to control the TX and RX active antennas 232 and 233. In certain aspects, each of the antennas 232 and 233 may be a phase array antenna. The RF system 200 enables the efficient transmission and reception of signals in at least the 60 GHz band. The baseband module 210 and RF module 230 are apart from each other and may be connected using a single transmission line 250 (e.g., a coax cable) through the interface units 220 and 240.

In certain aspects, at least one of a control signal, an IF signal, or a LO signal may be simultaneously transferred over the transmission line 250. While only a single transmission line 250 is illustrated, the control signal, the IF signal, and/or the LO signal may be simultaneously transferred over multiple transmission lines. In some cases, a power signal may optionally be transferred over the transmission line 250. It should be noted that the IF and control signals are transferred over the transmission line 250 in both directions. The control signal controls, at least, the switching of the TX and RX active antennas, the direction of the antenna (beam forming), and gain control. The LO signal may be used to synchronize the two baseband module 210 and the RF module 230 to perform up and down conversions of high frequency signals.

Each of the signals transferred over the transmission line 250 may have a different frequency band. In certain aspects, a frequency plan is disclosed that enables the efficient transfer of the five signals over the transmission line 250. According to certain aspects, the transmission line 250 can be formed by fabricating a metal line on a multilayer substructure.

The interface units 220 and 240 may be used for the simultaneous transfer of the LO, IF, and control signals over the transmission line 250. The interface units 220 and 240 multiplex and demultiplex the various signals and perform impedance matching between the transmission line 250 and the circuit boards to which the baseband module 210 and RF module 230 are connected to.

As illustrated, the chip-to-line interface unit 220 includes a multiplexer 222 and a bias-T unit 224 and the line-to-chip interface unit 240 includes a demultiplexer 242 and a bias-T unit 244. A bias-T circuit may be a circuit configured to combine (or split) high-frequency and low-frequency signals. The multiplexer 222 multiplexes the IF signal, LO signal, and control signal to be provided to the RF module 230. In some cases, a Bias-T unit 224 may optionally be used to couple a supply voltage signal (e.g., a direct-current (DC) signal) from a power source to the multiplexed signal before being provided to RF module 230 via the transmission line 250. In certain aspects, the multiplexer 222 may be configured to perform demultiplexing operations to produce one or more IF signals and a control signal which may be received from the RF module 230.

The demultiplexer 242 de-multiplexes the multiplexed signal received via the transmission line 250, to generate the control signal, IF signal, and LO signal. In some cases, a Bias-T unit 244 may be used to extract the supply voltage signal to power the RF module 230 if the multiplexed signal received via the transmission line 250 includes a supply voltage signal. In certain aspects, the demultiplexer 242 may also perform multiplexing operations on the IF signal (results of a down conversion of received RF signals) and control signal to be transferred to the baseband module 210.

In certain aspects, the multiplexer 222 and Bias-T unit 224 may be integrated in the baseband module 210 which may be embedded in a radio-frequency integrated circuit (RFIC). In some cases, the demultiplexer 242 and Bias-T unit 244 may be integrated in the RF module 230, which may be fabricated as an RFIC. In certain aspects, the multiplexer 222 and demultiplexer 242 may be part of the baseband module 210 and the RF module 230 respectively, and thus, may be part of the RFICs. In some cases, the Bias-T units 224 and 244 may be part of a mainboard 201 and an antenna board 202, respectively.

In certain aspects, the baseband module 210 and the RF module 230 are fabricated on different substrates and connected using a transmission line (e.g., a cable). According to certain aspects, the RF and baseband modules may be fabricated on the same substrate and connected using a transmission line.

Figure 3:
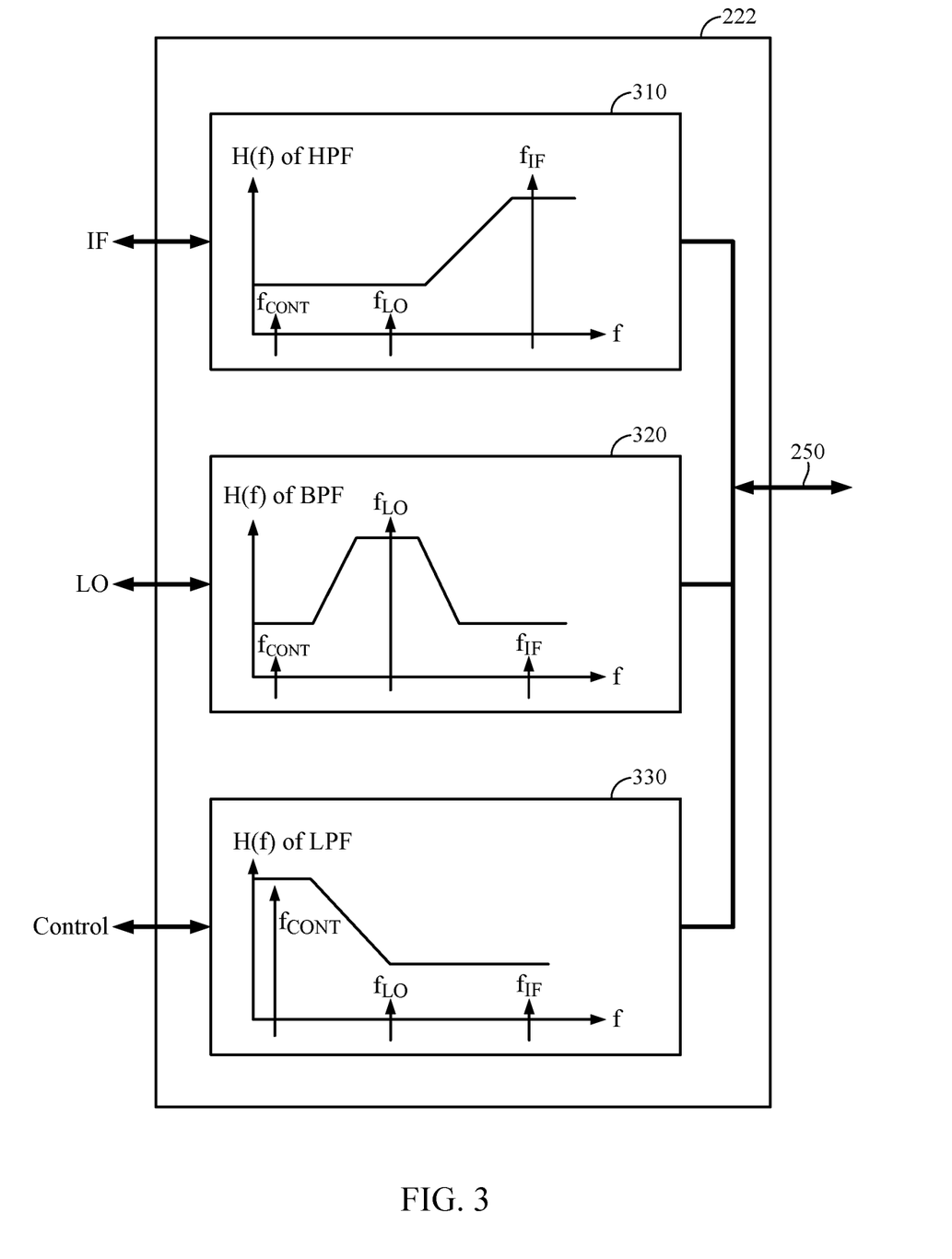
FIG. 3 illustrates an example multiplexer, in accordance with certain aspects of the present disclosure.

FIG. 3 illustrates a block diagram of the example multiplexer 222, in accordance with certain aspects of the present disclosure. The multiplexer 222 may include a high-pass filter (HPF) 310, a base-pass filter (BPF) 320, and a low-pass filter (LPF) 330 having a passband corresponding to the frequencies of the control signal ($f_{CONT}$), LO signal $f_{LO}$, and the IF signal ($f_{IF}$), respectively. Thus, the multiplexer 222 generates a multiplexed signal comprising the control signal, LO signal, and the IF signal. A LPF may comprise a circuit for passing low-frequency signals and blocking (or at least attenuating) high-frequency signals, a HPF may comprise a circuit for passing high-frequency signals and blocking (or at least attenuating) low-frequency signals, and BPF may comprise a circuit for passing signals within a certain frequency band, and blocking (at at least attenuating) all other signals.

While the description above refers to the laptop computer 100 as a reference example of a type of device that may implement the techniques presented herein, the techniques presented herein may be implemented in a variety of other types of wireless nodes such as any mobile device (e.g., mobile phone), access terminal, access point, base station, desktop computer, or household device. Further, the form factor of the RF system 110 described above is provided as a reference example, and the techniques presented herein can be applied to other configurations of the RF system 110.

Example Control Mechanism in Distributed Antenna Modules

Certain aspects of the present disclosure provide techniques for controlling a radio-frequency (RF) module via a multiplexed signal, the multiplexed signal including a control signal that is used to enable/disable a regulator for powering an RF module, such as the RF module 230 of FIG. 2. A regulator may comprise, for example, a circuit used to regulate a voltage such as a linear regulator or a switch mode regulator (e.g., a direct-current (DC)-to-DC regulator). A DC-to-DC regulator may be a regulator that receives an input DC signal and generates a regulated DC output signal. Certain aspects of the present disclosure provide separate interfaces for receiving the multiplexed signal and a power signal for the regulator. The power signal may be received via the interface from a power source that is separate from a source of the multiplexed signal, allowing for a reduction in area and cost, and improving routing of the multiplexed signal, as described in more detail herein.

Figure 4:
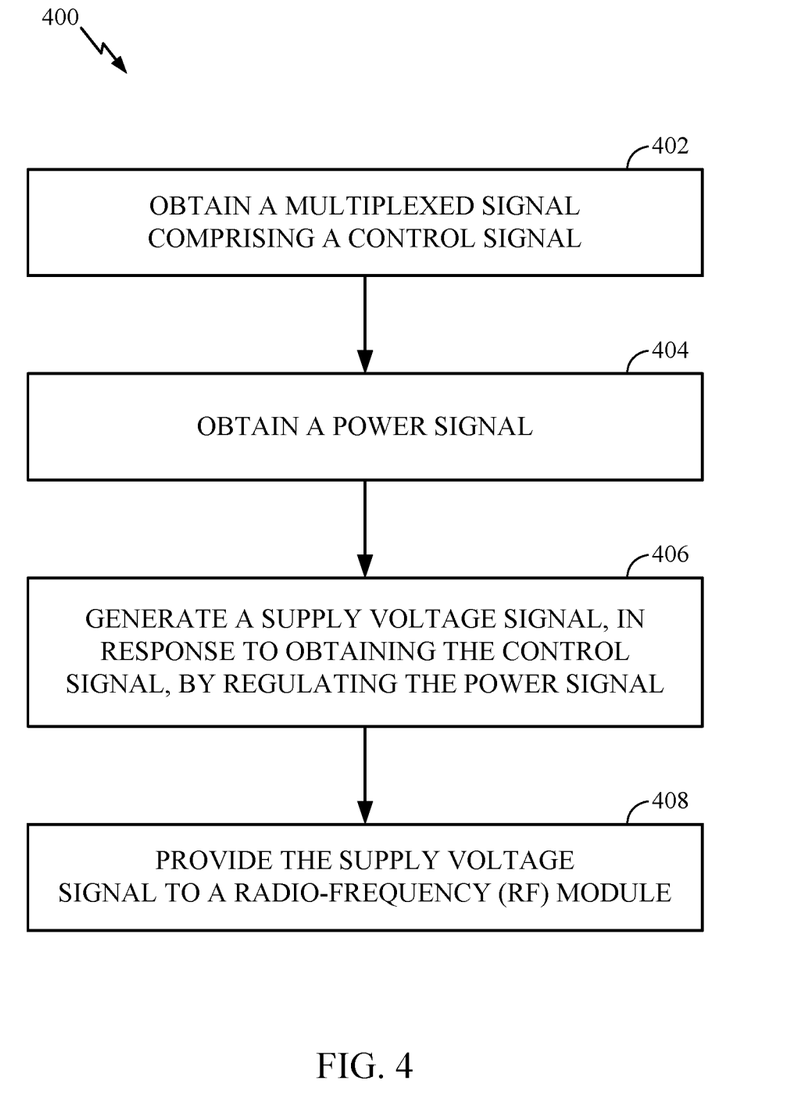
FIG. 4 is a flow diagram of example operations for wireless communications by an antenna board of an apparatus, in accordance with certain aspects of the present disclosure.

FIG. 4 is a flow diagram of example operations 400 for wireless communications, in accordance with certain aspects of the present disclosure. The operations 400 may be performed by an apparatus (e.g., a wireless node), such as the antenna board 202 of FIG. 2.

The operations 400 begin, at 402, by obtaining a multiplexed signal comprising a control signal, and at block 404, obtaining a power signal. At block 406, the apparatus generates a supply voltage signal, in response to obtaining the control signal, by regulating the power signal, and at block 408, provides the supply voltage signal to an RF module.

Figure 5:
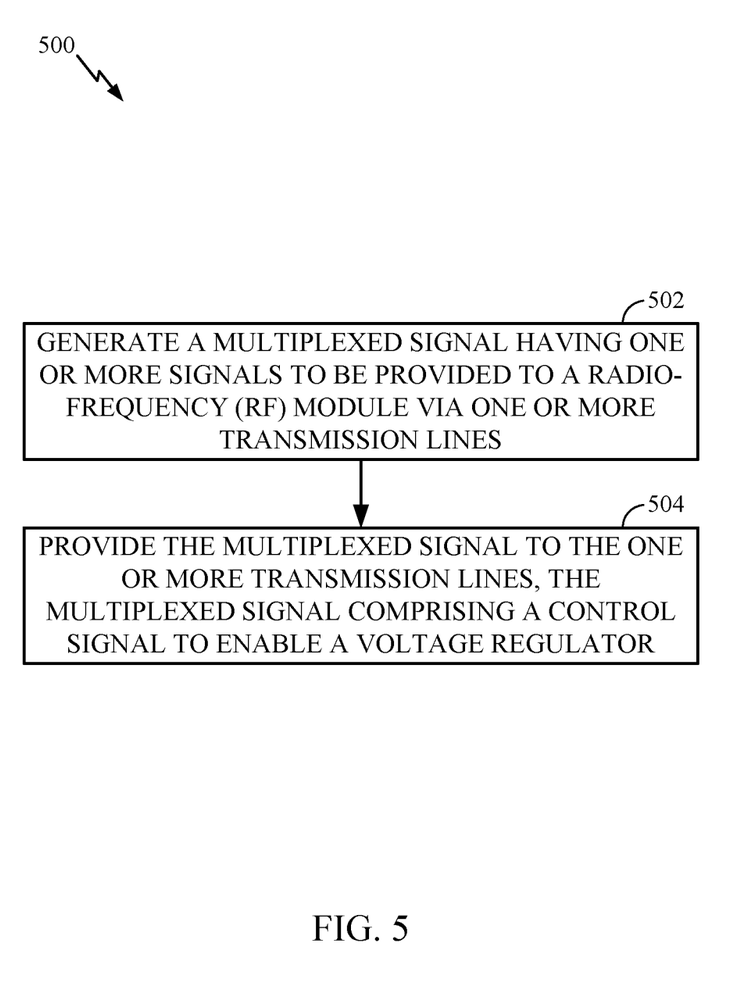
FIG. 5 is a flow diagram of example operations for wireless communications by a mainboard of an apparatus, in accordance with certain aspects of the present disclosure.

FIG. 5 is a flow diagram of example operations 500 for wireless communications, in accordance with certain aspects of the present disclosure. The operations 400 may be performed by an apparatus (e.g., a wireless node), such as the mainboard 201 of FIG. 2.

The operations 500 begin, at 502, by generating a multiplexed signal having one or more signals to be provided to a radio-frequency (RF) module via one or more transmission lines. At block 504, the operations 500 continue by providing the multiplexed signal to the one or more transmission lines, the multiplexed signal comprising a control signal to enable a voltage regulator.

Figure 6:
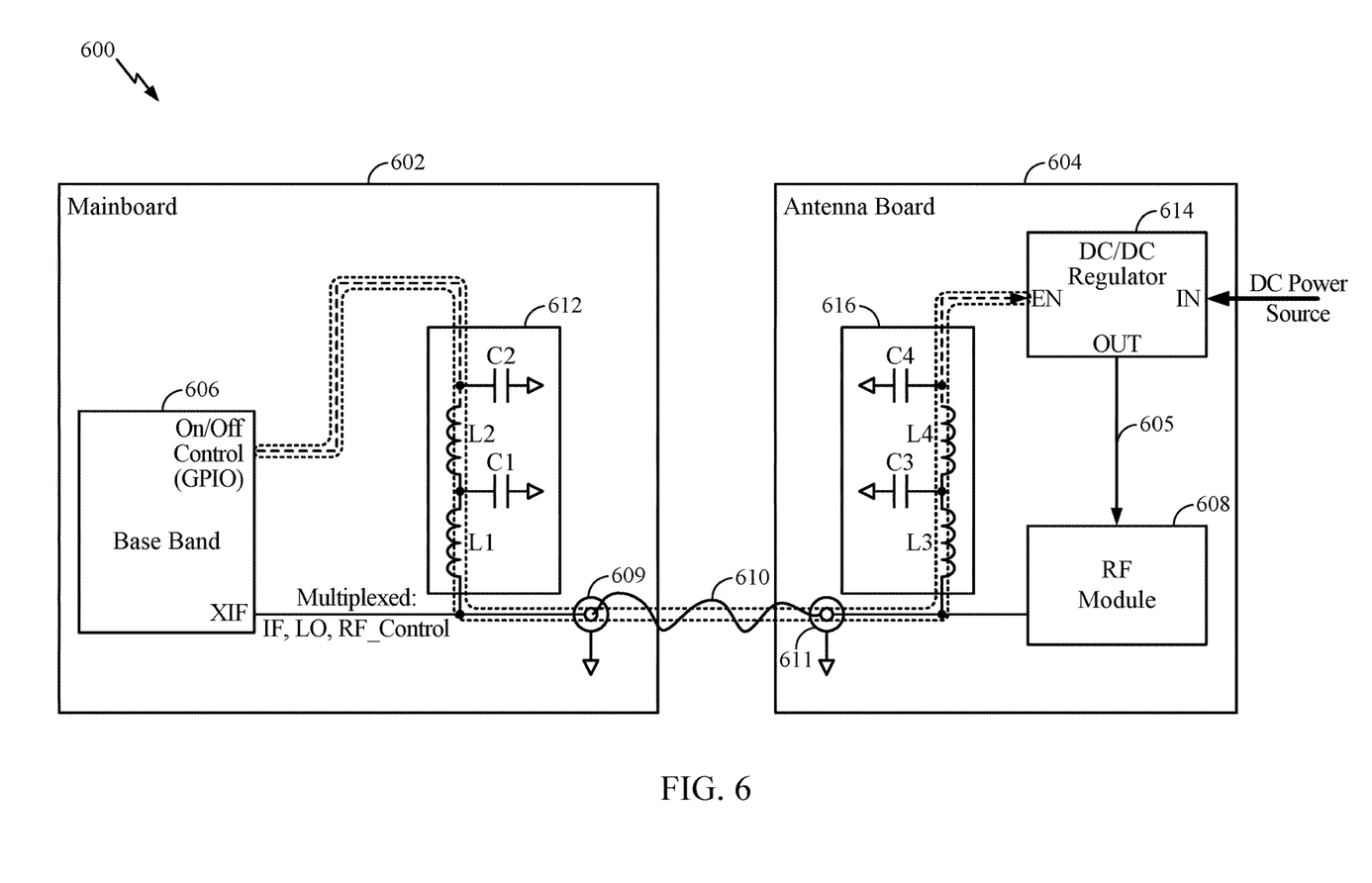
FIG. 6 illustrates an example RF system including a mainboard and an antenna board, in accordance with certain aspects of the present disclosure.

FIG. 6 illustrates an example RF system 600 including a mainboard 602 and an antenna board 604, in accordance with certain aspects of the present disclosure. The mainboard 602 may include a baseband module 606 (e.g., baseband integrated circuit (IC)) that generates a multiplexed signal. The multiplexed signal may include an IF signal, an LO signal, and a control signal for controlling operations of an RF module (e.g., RF integrated circuit (RFIC)), as described above with respect to FIG. 2.

In some cases, a power signal (e.g., a DC signal) may be combined with the multiplexed signal via a bias-T circuit as described with respect to FIG. 2. The power signal may be gated by a switch on the main board. As used herein, a mainboard may refer to a circuit board that includes a baseband module such as the baseband module 606, and an antenna board may refer to a circuit board that includes an RF module such as the RF module 608. The switch may be opened or closed to remove or provide power to the antenna board 604. However, providing the power signal to the antenna board from the mainboard may pose certain issues, such as increased power loss due to the current-resistance (IR) drop across the transmission line (e.g., transmission line 250) and the bias-T unit 224 (e.g., bias-T circuit).

Certain aspects of the present disclosure provide techniques for powering and enabling/disabling the RF module 608 using a separate power source provided to the antenna board 604. For example, instead of including a power signal on the multiplexed signal, an enable control signal may be coupled on the multiplexed signal via the bias-T circuit 612, to enable/disable the regulator 614 for providing a supply voltage signal to the RF module 608 via a trace 605, as illustrated. For example, the enable control signal may be combined with a multiplexed signal, generated by baseband module 606, via the bias-T circuit 612. The multiplexed signal, including the enable control signal, may be provided the antenna board over a transmission line 610. The enable control signal may be provided to an enable input of the regulator 614. For example, a bias-T circuit 616 on the antenna board 604 may be used to extract the enable control signal from the multiplexed signal and provide the extracted enable control signal to the enable input of the regulator 614. In this case, the regulator 614 may receive power from a separate power source, as illustrated. In certain aspects, the regulator 614 may be implemented as a DC-to-DC regulator.

By providing a separate power source for the regulator, as opposed to including a power signal on the multiplexed signal from the mainboard 602, area consumption of the RF system 600 may be reduced. For example, since the enable control signal is a low-power signal compared to a power signal, the size of the bias-T circuits 612 and 616 may be reduced, saving total area consumption by the RF system 600. In certain aspects, the bias-T circuit 612 may be implemented as a low-pass filter using inductors and capacitors L1, C1, L2, C2 and the bias-T circuit 616 may be implemented as a low-pass filter using inductors and capacitors L3, C3, L4, C4, as illustrated.

Figure 7:
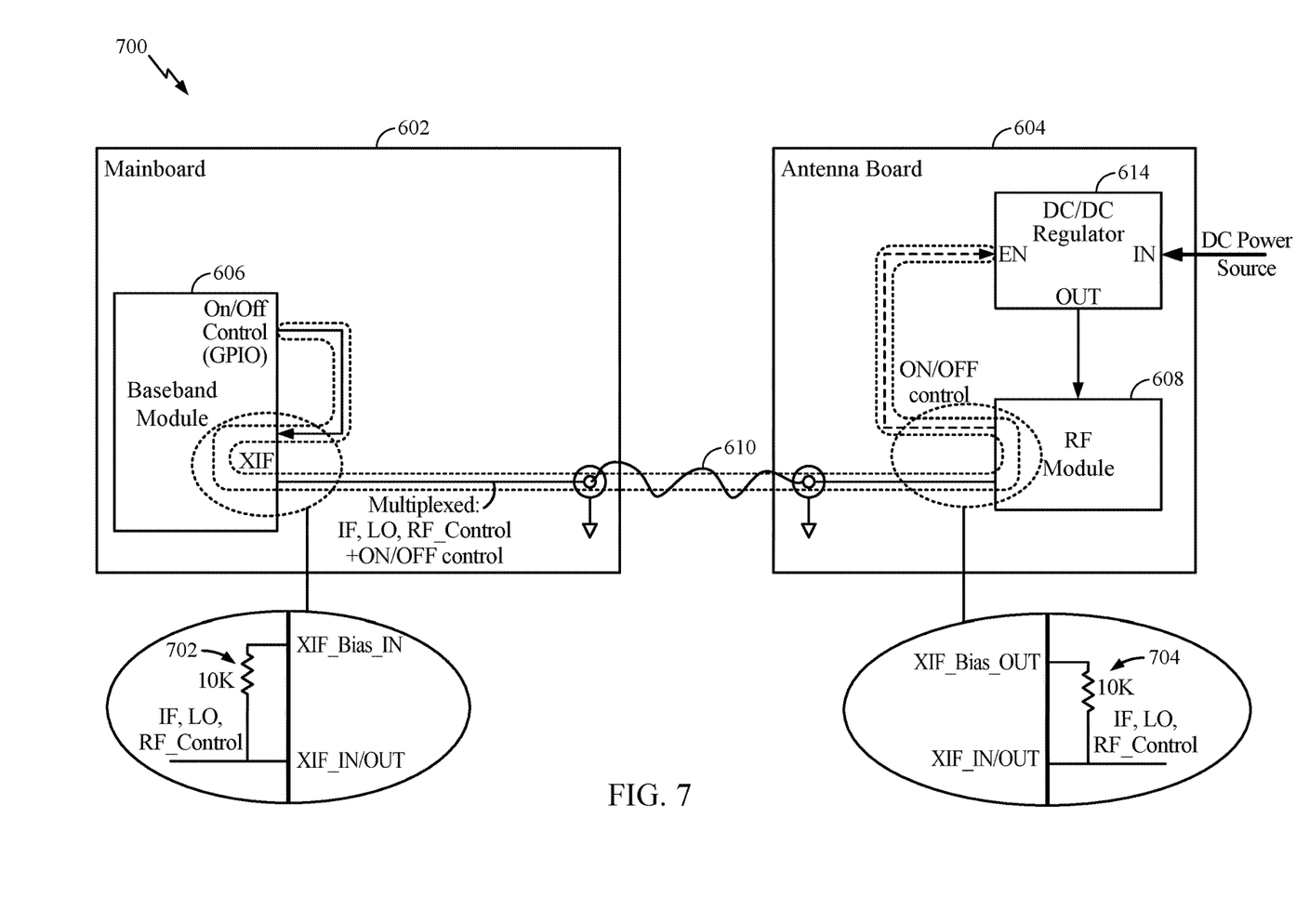
FIG. 7 illustrates an example RF system including a mainboard and an antenna board having a bias-T circuit in an integrated circuit, in accordance with certain aspects of the present disclosure.

FIG. 7 illustrates an example configuration of an RF system 700, in accordance with certain aspects of the present disclosure. As presented above, the enable control signal is a low-power signal. Therefore, in addition to reducing the size of the bias-T circuit 612, the bias-T circuit may be integrated with the baseband module 606 (e.g., baseband IC) to further reduce area consumption. In certain aspects, the enable control signal may be coupled on the multiplexed signal via a resistive element 702 having relatively high resistance (e.g., 10K ohm), and the resistive element 702 may be integrated as part of the baseband module, as illustrated. Similarly, on the antenna board 604, a resistive element 704 having relatively high resistance (e.g., 10K ohm) may be integrated as part of the RF module (e.g., an RFIC) to provide the enable control signal to the enable input (EN) of the regulator 614, as illustrated. By using an integrated resistive element to provide the enable control signal to the enable input of the regulator 614, no external bias-T components may be used, reducing area consumption and cost, and improving routing of the multiplexed signal.

In certain aspects, the enable control signal may be generated directly from a register of the baseband module 606 and included as part of the multiplexed signal (e.g., without the resistive element 704). For example, the baseband module 606 may include a register to set the enable control signal, which may be multiplexed with one or more other signals (e.g., the LO signal, IF signal, or a RF module control signal), and provided to the antenna board via the transmission line 610.

Figure 8:
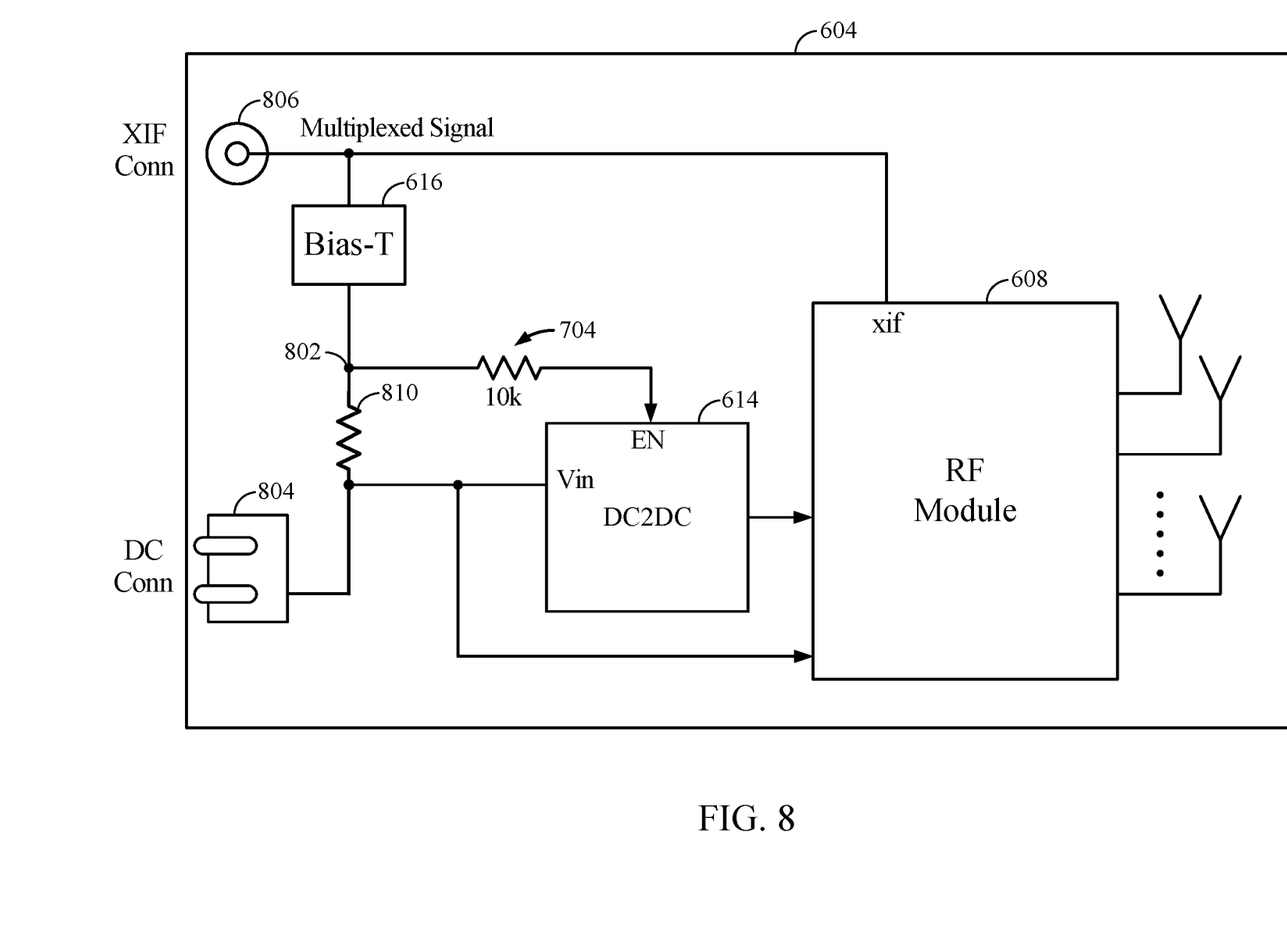
FIG. 8 illustrates an example configuration of an antenna board, in accordance with certain aspects of the present disclosure

FIG. 8 illustrates an example configuration of the antenna board 604, in accordance with certain aspects of the present disclosure. The antenna board 604 includes a power interface 804 (e.g., power connector) for receiving the power signal and an interface 806 (e.g., external interface (XIF)) for receiving the multiplexed, as illustrated. The power signal received via the power interface 804 may be used to power the regulator 614. The multiplexed signal received via the interface 806 may be provided to the bias-T circuit 616 to extract and provide the enable control signal to the enable input of the regulator 614.

As illustrated, the regulator 614 may generate a supply voltage signal for the RF module. In some cases, the power signal from the power interface 804 may also be provided to the RF module 608. In certain aspects, the antenna board may be configured to dynamically replace the bias-T circuit 616 with a resistive element 704. The bias-T circuit 616 may be coupled to or replaced with a resistive element 704. For example, a jumper 810 (e.g., a 0 ohm resistive element) may be coupled between the power interface and a node 802, allowing for the power connector to be selectively coupled to node 802. For example, the power interface 804 may be shorted to node 802 such that the regulator 614 may be enabled by the power signal received via the power interface 804 instead of the Bias-T circuit 616. Thus, in this case, the bias-T circuit 616 could be removed to reduce the area consumption by the antenna board 604. In some cases, the jumper 810 may be removed, decoupling the power interface 804 from the node 802. In this case, the regulator 614 may be enabled via the enable control signal included as part of the multiplexed signal, and extracted via the Bias-T circuit 616.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

Figure 4A:
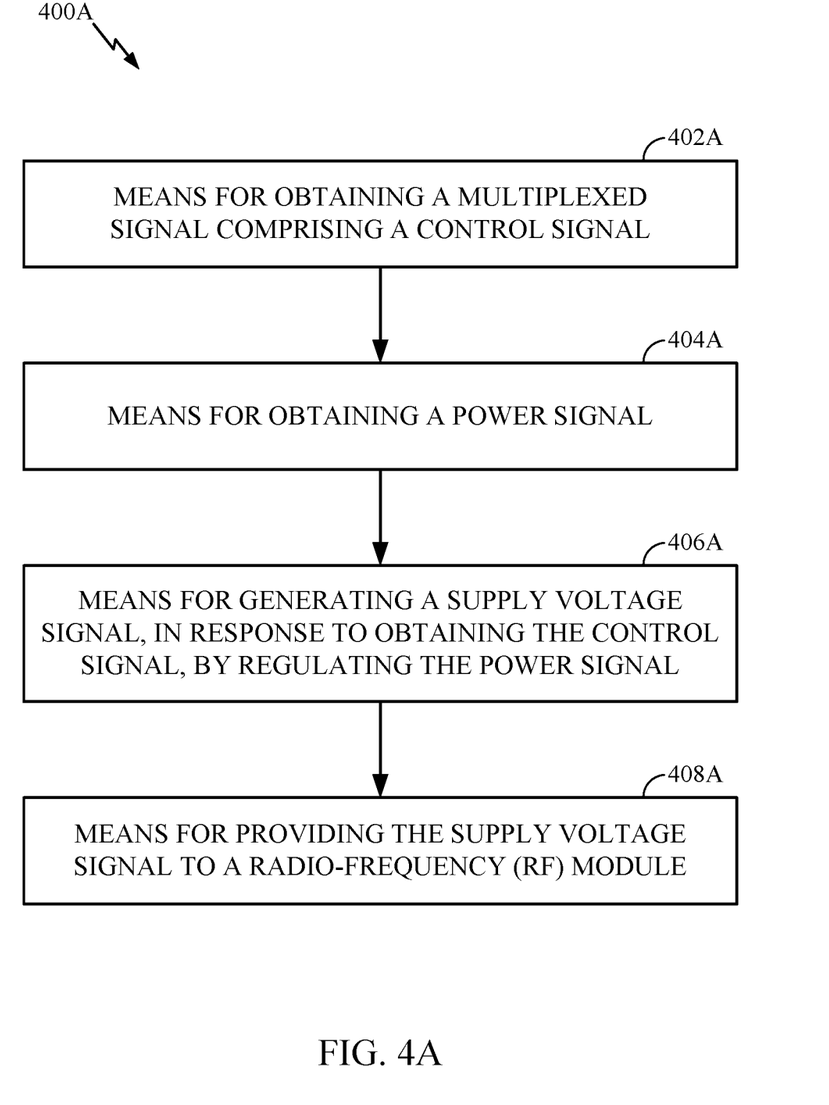
FIG. 4A illustrates example means capable of performing the operations shown in FIG. 4.
Figure 5A:
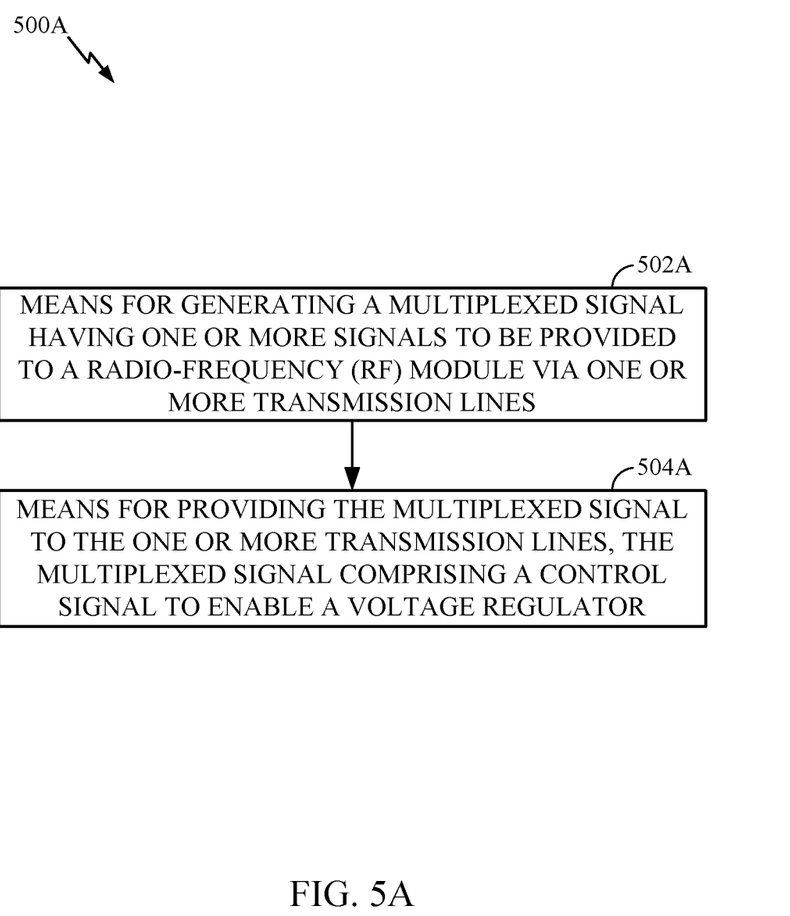
FIG. 5A illustrates example means capable of performing the operations shown in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400 illustrated in FIG. 4, and operations 500 illustrated in FIG. 5, correspond to means 400A illustrated in FIG. 4A, means 500A illustrated in FIG. 5A, respectively.

For example, means for obtaining a multiplexed signal and means for providing the multiplexed signal may comprise, for example an interface such as the power interface 804, the interface 806, the interface 609, and/or the interface 611. Means for obtaining a power signal and means for providing a control signal may comprise, for example, a circuit, such as the bias-T circuit 612, the bias-T circuit 616, the resistive element 702, and/or the resistive element 704. Means for generating a supply voltage signal may comprise, for example, a regulator such as the regulator 614. Means for providing the supply voltage signal may include trace, such as the trace 605. Means for generating may comprise an RF module, such as the RF module 608 or a baseband module, such as the baseband module 606.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a station, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for outputting a first frame for transmission to another apparatus at a first time, instructions for obtaining, at a second time, a second frame transmitted by the other apparatus in response to the first frame, and instructions for generating a third frame for transmission to the other apparatus via the transmit interface, the third frame including information indicating a difference between the first time and the second time and an indication of at least one of an angle of departure of the first frame or an angle of arrival of the second frame. In another example, instructions for outputting a second frame for transmission to another apparatus in response to a first frame received from the other apparatus, instructions for obtaining a third frame transmitted by the other apparatus in response to the second frame, the third frame including information indicating a difference between the first time and the second time and an indication of at least one of an angle of departure of the first frame or an angle of arrival of the second frame, and instructions for estimating a location of the apparatus relative to the other apparatus based, at least in part, on the difference between the first time and the second time and at least one of the angle of departure of the first frame or the angle of arrival of the second frame.

Further, it should be appreciated that modules and/or other appropriate means for performing the methods and techniques described herein can be downloaded and/or otherwise obtained by a STA and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a STA and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication, comprising:
   a circuit board;
   a first interface configured to obtain, from a baseband module, a multiplexed signal comprising a control signal;
   a second interface configured to obtain a power signal, wherein the first interface and the second interface are different interfaces on the circuit board;
   a radio frequency (RF) module on the circuit board;
   a regulator on the circuit board and coupled to the second interface and configured to receive the power signal from the second interface, wherein the regulator comprises a power terminal configured to obtain the power signal and an enable terminal configured to obtain the control signal;
   a circuit on the circuit board and configured to provide the control signal to the regulator, wherein the regulator, in response to the control signal, is configured to generate a supply voltage signal by regulating the power signal and provide the supply voltage signal to the RF module; and a jumper on the circuit board and disposed between the power terminal of the regulator and the enable terminal of the regulator.

2. The apparatus of claim 1, wherein the multiplexed signal further comprises at least one of an intermediate frequency (IF) signal, a local-oscillator (LO) frequency signal, or an RF module control signal.

3. The apparatus of claim 1, wherein the regulator is configured to be enabled by receiving the control signal.

4. The apparatus of claim 1, wherein the circuit comprises a bias-T circuit or a resistive element.

5. The apparatus of claim 4, wherein the bias-T circuit comprises a low-pass filter (LPF).

6. The apparatus of claim 1, wherein the first interface is configured to obtain the multiplexed signal via a single transmission line.

7. The apparatus of claim 1, wherein the RF module comprises an RF integrated circuit (RFIC), and wherein the circuit is integrated in the RFIC.

8. A wireless node, comprising:
at least one antenna;
a circuit board;
a first interface configured to obtain, from a baseband module, a multiplexed signal comprising a control signal;
a second interface configured to obtain a power signal, wherein the first interface and the second interface are different interfaces on the circuit board;
a radio frequency (RF) module on the circuit board;
a regulator on the circuit board and coupled to the second interface and configured to receive the power signal from the second interface, wherein the regulator comprises a power terminal configured to obtain the power signal and an enable terminal configured to obtain the control signal;
a circuit on the circuit board and configured to provide the control signal to the regulator, wherein the regulator, in response to the control signal, is configured to generate a supply voltage signal by regulating the power signal and provide the supply voltage signal to the RF module, wherein the RF module is configured to output for transmission RF signals via the at least one antenna; and
a jumper on the circuit board and disposed between the power terminal of the regulator and the enable terminal of the regulator.

* * * * *